(12) United States Patent
Konow Krause et al.

(10) Patent No.: US 10,649,968 B2
(45) Date of Patent: May 12, 2020

(54) SMALLER PROXIMATE SEARCH INDEX

(71) Applicant: eBay Inc., San Jose, CA (US)

(72) Inventors: Roberto Daniel Konow Krause, Los Gatos, CA (US); Seema Jethani, San Jose, CA (US); Mohnish Kodnani, Campbell, CA (US); Vishnusaran Ramaswamy, Campbell, CA (US); Jonathan Baggott, Castro Valley, CA (US); Harish Kumar Vittal Murthy, Fremont, CA (US)

(73) Assignee: eBay Inc., San Jose, CA (US)

(*) Notice: Subject to any disclaimer, the term of this patent is extended or adjusted under 35 U.S.C. 154(b) by 119 days.

(21) Appl. No.: 15/691,610

(22) Filed: Aug. 30, 2017

(65) Prior Publication Data

US 2019/0065539 A1    Feb. 28, 2019

(51) Int. Cl.
*G06F 17/30* (2006.01)
*G06F 16/22* (2019.01)
(Continued)

(52) U.S. Cl.
CPC ........ *G06F 16/2237* (2019.01); *G06F 16/211* (2019.01); *G06F 16/258* (2019.01)

(58) Field of Classification Search
CPC .. G06F 16/2237; G06F 16/211; G06F 16/258; G06F 16/22; G06F 16/31; G06F 16/41; G06F 16/51
(Continued)

(56) References Cited

U.S. PATENT DOCUMENTS 6,463,506 B1 * 10/2002 McAllister .......... G06F 12/0822
                                                        711/118
7,681,013 B1 *  3/2010 Trivedi ............... G06F 9/30032
                                                        341/67
(Continued)

OTHER PUBLICATIONS

Tellez et al., "A Brief Index for Proximity Searching", Jul. 2014, ResearchGate, p. 1-9. Download: https://www.researchgate.net/publication/220843654_A_Brief_Index_for_Proximity_Searching (Year: 2014).*

(Continued)

*Primary Examiner* — Hares Jami
(74) *Attorney, Agent, or Firm* — Shook, Hardy & Bacon LLP

(57) ABSTRACT

A data management system accesses a set of vectors containing binary values generates a corresponding set of sequentially ordered vector blocks. Each vector contains a set of two or more binary values and a numerical vector identifier. The data management system generates a block index based on each corresponding set of sequentially ordered vector blocks. The block index includes a set of vector block arrays, each corresponding to a respective sequential position and including one vector block from each of the sets of sequentially ordered vector blocks that are in the respective sequential position. The vector blocks in each vector block array being are ordered sequentially based on two or more sequential binary values in each respective vector block. For each vector block array, the data management system combines pairs of sequentially ordered vector blocks containing matching sets of two or more binary values into combined vector blocks.

20 Claims, 12 Drawing Sheets

(51) Int. Cl.
*G06F 16/25* (2019.01)
*G06F 16/21* (2019.01)

(58) Field of Classification Search
USPC .......................................... 707/711, 741, 745
See application file for complete search history.

(56) References Cited

U.S. PATENT DOCUMENTS

| | | | |
|---|---|---|---|
| 8,131,752 B2 | 3/2012 | Nir et al. | |
| 8,346,778 B2* | 1/2013 | Ganesh ................... | G06F 16/00 707/741 |
| 9,454,713 B2 | 9/2016 | Liu et al. | |
| 2013/0246438 A1* | 9/2013 | Gestrelius ........... | G06F 16/2237 707/745 |
| 2015/0186471 A1* | 7/2015 | Yammahi ............ | G06F 16/2468 707/780 |
| 2015/0254344 A1* | 9/2015 | Kulkarni ............. | G06F 16/7847 707/747 |
| 2015/0363510 A1 | 12/2015 | Lin et al. | |
| 2016/0012094 A1* | 1/2016 | Gaumnitz ........... | G06F 16/2322 707/700 |
| 2016/0378828 A1* | 12/2016 | Hopcroft ............... | G06F 16/316 707/718 |
| 2017/0277737 A1 | 9/2017 | Singh et al. | |
| 2020/0012630 A1 | 1/2020 | Konow Krause et al. | |

OTHER PUBLICATIONS

Gog, et al., "Fast and Compact Hamming Distance Index", Proceedings of the 39th International ACM SIGIR conference on Research and Development in Information Retrieval, Jul. 17-21, 2016, 285-294 pages.

Mitra et al., "A Dual Embedding Space Model for Document Ranking", Retrieved from the Internet: <https://www.microsoft.com/en-us/research/uploads/prod/2016/02/1602.01137v1.pdf>, Apr. 11-15, 2016, 10 pages.

Johnson et al., "Billion-Scale Similarity Search With GPUs", Retrieved from the Internet URL: <https://arxiv.org/pdf/1702.08734.pdf>, Feb. 28, 2017, 12 pages.

Microsoft, Dual Embedding Space Model (DESM), Retrieved from the Internet URL : <https://www.microsoft.com/en-us/research/project/dual-embedding-space-model-desm/>, Jan. 21, 2016, 4 pages.

Nalisnick et al., "Improving Document Ranking with Dual Word Embeddings", WWW'16 Companion, ACM 978-1-4503-4144—Aug. 16, 2004, Apr. 11-15, 2016, 2 pages.

Douze et al., "Faiss: A Library for Efficient Similarity Search", Facebook Engineering, Retrieved from the Internet URL : <https://code.fb.com/data-infrastructure/faiss-a-library-for-efficient-similarity-search/>, Mar. 29, 2017, 9 pages.

* cited by examiner

| $V_1$ | $V_2$ | $V_3$ | $V_4$ | $\cdots$ | $V_n$ |
|---|---|---|---|---|---|
| 0.1 | 0.4 | 3.1 | 0.4 | | 0.4 |
| 1.2 | 1.6 | 3.6 | 1.6 | | 1.6 |
| 3.1 | 3.2 | 2.2 | 3.2 | | 3.2 |
| 2.3 | 2.3 | 6.3 | 2.3 | | 2.3 |
| 1.2 | 1.6 | 1.8 | 1.6 | | 1.6 |
| 3.4 | 3.9 | 3.1 | 3.9 | | 3.9 |
| 5.3 | 8.3 | 8.3 | 8.3 | | 8.3 |
| 1.1 | 2.3 | 2.3 | 2.3 | | 2.3 |
| 7.2 | 7.7 | 7.4 | 7.7 | | 7.7 |
| 1.2 | 1.3 | 4.3 | 1.3 | | 1.3 |
| 3.2 | 3.6 | 1.8 | 3.6 | | 3.6 |
| 1.4 | 2.4 | 2.4 | 2.4 | | 4.2 |

*FIG. 2*

| | $V_1$ | $V_2$ | $V_3$ | $V_4$ | $\cdots$ | $V_n$ |
|---|---|---|---|---|---|---|
| | 0 | 0 | 0 | 0 | | 1 |
| | 1 | 1 | 1 | 1 | | 1 |
| | 0 | 0 | 0 | 0 | | 0 |
| | 1 | 1 | 1 | 1 | | 1 |
| | 1 | 1 | 1 | 1 | | 1 |
| | 1 | 1 | 1 | 1 | | 1 |
| | 0 | 0 | 1 | 0 | | 0 |
| | 0 | 0 | 1 | 0 | | 1 |
| | 0 | 0 | 0 | 0 | | 0 |
| | 0 | 1 | 0 | 0 | | 0 |
| | 1 | 1 | 1 | 0 | | 1 |
| | 0 | 1 | 1 | 0 | | 0 |

FIG. 3

Index B₁ = [V₄|0,0], [V₁|0,1], [V₂|1,1], [V₃|1,1]

Index B₂ = [V₁|0,0], [V₃|0,0], [V₄|0,1], [V₂|1,0]

Index B₃ = ⋮

Index B₄ = ⋮

*FIG. 4C*

Index $B_1$ = | $V_4$ | 0 | 0 | | $V_1$ | 0 | 1 | | $V_2, V_3$ | 1 | 1 |

Index $B_2$ = | $V_1, V_3$ | 0 | 0 | | $V_4$ | 0 | 1 | | $V_2$ | 1 | 0 |

Index $B_3$ = ⋮

Index $B_4$ = ⋮

*FIG. 4D*

Index $B_1$ = 
| 4 | 1 |
|---|---|
| 0 | 1 |
| 0 | 2,1 |

Index $B_2$ = 
| 1,2 | 4 |
|---|---|
| 0 | 0 |
| 0 | 1 |
|   | 2 |
|   | 0 |
|   | 1 |

Index $B_3$ = •••

Index $B_4$ = •••

FIG. 4E

Index $B_1$ =

| 4 | 1 |
|---|---|
| 0 | 1 |

| 2,1 |
|-----|
| 2   |

Index $B_2$ =

| 1,2 | 4 |
|-----|---|
| 0   | 1 |

| 2 |
|---|
| 1 |

Index $B_3$ = •••

Index $B_4$ = •••

*FIG. 4F*

SMALLER PROXIMATE SEARCH INDEX

TECHNICAL FIELD

The present disclosure generally relates to the technical field of special-purpose machines that facilitate proximate search, including computerized variants of such special-purpose machines and improvements to such variants, and to the technologies by which such special-purpose machines become improved compared to other special-purpose machines that facilitate proximate search. In particular, the present disclosure addresses systems and methods for smaller proximate search.

BACKGROUND

Computing devices typically use advanced algorithms to represent data objects (e.g., images, audio files, text documents, etc.), as vectors. These vectors include multiple dimensions that each represent a feature of the data object. One use for these vectors is identifying matching or similar data objects. For example, distance functions are used to identify vectors that are closest to a target vector representing a target data object (e.g., k-nearest neighbors). The nearby vectors indicate that the corresponding data objects either match or are similar to the target data object. While effective, these methods are resource intensive for large data sets.

Current improvements include converting floating values in the vectors to binary values, thereby reducing the size and complexity of the vectors. A hamming distance between the converted vectors is determined to identify similar vectors. The hamming distance indicates the number of positions that differ between two binary strings. A subset of vectors that have a hamming distance below a threshold are identified as candidate vectors. The system then uses distance functions on this smaller subset of candidate vectors, thereby reducing resource usage.

While these methods represent improvements, an additional reduction in resource usage is desirable. Accordingly, additional technical improvements are needed.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

FIG. 2 shows vectors representing data object, according to some example embodiments.

FIG. 3 shows vectors representing data objects that have been converted to binary values, according to some example embodiments.

FIGS. 4A-4F show generating vector blocks and a block index, according to some example embodiments.

DETAILED DESCRIPTION

Figure 1:
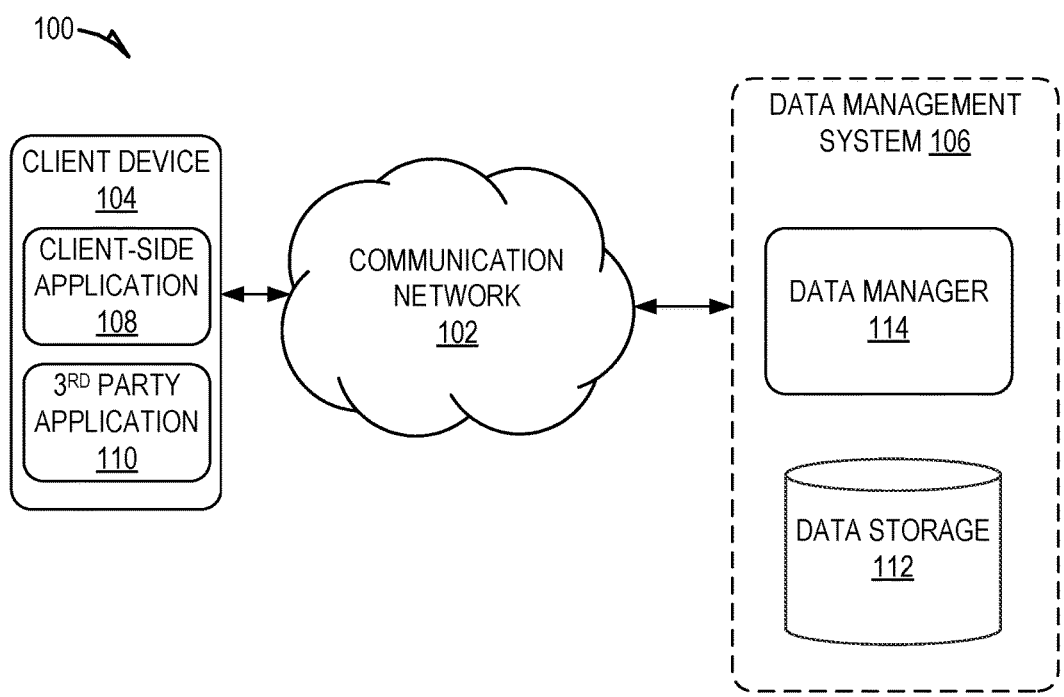
FIG. 1 shows an exemplary system for providing smaller proximate search, according to some example embodiments.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Disclosed are systems, methods, and computer-readable storage media for smaller proximate search. A data management system uses advanced algorithms to represent data objects (e.g., images, audio files, text documents, etc.), as vectors. These vectors include multiple dimensions that each represent a feature of the data object. One use for these vectors is identifying matching or similar data objects. For example, the data management system uses distance functions to determine the nearest reference vectors to a target vector. The nearest reference vectors represent data objects that are close to the target vector representing a target data object. Nearby vectors indicate that the corresponding data objects match or are similar to the target data object. While effective, these methods are resource intensive for large data sets.

To reduce resource usage, the data management system converts floating values in the vectors to binary values, thereby reducing the size and complexity of the vectors. For example, the data management system assigns a value of 1 to each floating value that meets or exceeds a threshold value, and a value of 0 to each floating value below the threshold value. The resulting binary strings represent the vectors in simpler terms.

The data management system then determines hamming distances between the converted vectors (i.e., binary strings) and a converted target vector. The hamming distance indicates the number of positions that differ between two binary strings. The data management system identifies a subset of vectors that have a hamming distance below a threshold from the target vector, yielding a set of candidate vectors. The data management system then uses distance functions on this smaller subset of candidate vectors, thereby reducing resource usage.

To increase efficiency in calculating the hamming distances, the data management system generates a set of sequentially ordered vector blocks for each of the vectors. Each vector block in a set of sequentially ordered vector blocks contains a set of two or more binary values that are ordered sequentially in the vector, as well a numerical vector identifier identifying the vector.

The data management system generates a block index based on the sets of sequentially ordered vector blocks. The block index includes a set of vector block arrays where each individual vector block array corresponding to one sequential position. Each of the vector block arrays includes one vector block from each set of sequentially ordered vector blocks that correspond to the same sequential position. As an example, the first vector block array includes vector blocks from the first sequential position (i.e., including the first and second sequentially ordered binary values in the vector). The second vector block array includes the vector blocks from the second sequential position (i.e., including the third and fourth sequentially ordered binary values in the vector) and so forth. The vector blocks in each vector block array are ordered sequentially based on their binary values, such as from lowest to highest or vice versa.

The data management system reduces the size of the block index by combining sequential vector blocks in each vector array that include the same binary values. The combined vector blocks include the binary values and the vector identifiers for the combined vector blocks. The data management system orders the vector identifiers sequentially from lowest to highest.

To further reduce the size of the block index, the data management system uses differential encoding to encode the values of the vector identifiers in each combined vector block as well as the binary values of each vector block.

FIG. 1 shows an exemplary system 100 for providing smaller proximate search, according to some example embodiments. While the system 100 shown employs a client-server architecture, the present inventive subject matter is, of course, not limited to such an architecture, and could equally well find application in an event-driven, distributed, or peer-to-peer architecture system, for example. Moreover, it shall be appreciated that although the various functional components of the system 100 are discussed in a singular sense, multiple instances of one or more of the various functional components may be employed.

As shown, the system 100 can include multiple computing devices connected to a communication network 102 and configured to communicate with each other through use of the communication network 102. The communication network 102 can be any type of network, including a local area network ("LAN"), such as an intranet, a wide area network ("WAN"), such as the internet, or any combination thereof. Further, the communication network 102 can be a public network, a private network, or a combination thereof. The communication network 102 can also be implemented using any number of communication links associated with one or more service providers, including one or more wired communication links, one or more wireless communication links, or any combination thereof. Additionally, the communication network 102 can be configured to support the transmission of data formatted using any number of protocols.

Multiple computing devices can be connected to the communication network 102. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 700 of FIG. 7

To facilitate communication with other computing devices, a computing device can include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

As shown, the system 100 includes a client device 104 and data management system 106. In the system 100, a user can interact with the data management system 106 through the client device 104 connected to the communication network 102 by direct and/or indirect communication. The client device 104 can be any of a variety of types of computing devices that include at least a display, a computer processor, and communication capabilities that provide access to the communication network 102 (e.g., a smart phone, a tablet computer, a personal digital assistant (PDA), a personal navigation device (PND), a handheld computer, a desktop computer, a laptop or netbook, or a wearable computing device).

The data management system 106 can consist of one or more computing devices and support connections from a variety of different types of client devices 104, such as desktop computers; mobile computers; mobile communications devices (e.g. mobile phones, smart phones, tablets, etc.); smart televisions; set-top boxes; and/or any other network enabled computing devices. The client device 104 can be of varying type, capabilities, operating systems, etc. Furthermore, the data management system 106 can concurrently accept connections from and interact with multiple client devices 104.

A user can interact with the data management system 106 via a client-side application 108 installed on the client device 104. In some embodiments, the client-side application 108 can include a data management system 106 specific component. For example, the component can be a stand-alone application, one or more application plug-ins, and/or a browser extension. However, the user can also interact with the data management system 106 via a third-party application 110, such as a web browser, that resides on the client device 104 and is configured to communicate with the data management system 106. In either case, the client-side application 108 and/or the third party application 110 can present a user interface (UI) for the user to interact with the data management system 106.

The data management system 106 can include a data storage 112 to store data. The stored data can include any type of data, such as digital data, documents, text files, audio files, video files, etc. The data storage 112 can be a storage device, multiple storage devices, or one or more servers. Alternatively, the data storage 112 can be a cloud storage provider or network storage. The data management system 106 can store data in a network accessible storage (SAN) device, in a redundant array of inexpensive disks (RAID), etc. The date storage 110 can store data items using one or more partition types, such as FAT, FAT32, NTFS, EXT2, EXT3, EXT4, ReiserFS, BTRFS, and so forth.

The data management system 106 includes a data manager 114 configured to identify similar data objects. A data object is any type of data such as an image file, audio file, text file, etc. The data manager 114 receives a target data object and searches for matching or similar data objects. For example, the data manager 114 provides a user interface that enables a user to provide target data object, such as an image, audio file, etc., and returns a listing of similar data objects.

To identify similar data objects, the data manager 114 converts a target data object into a vector representing the data object. The vector includes multiple dimensions that each represent a feature of the data object. The data manager 114 uses distance functions to identify vectors that are close to the target vector. Vectors that are nearby the target vector represent data objects that are similar to the target data object. For example, the data storage 112 stores data objects and their corresponding vectors. The data manager 114 returns any similar data objects in response to a request.

The data manager 114 is configured to implement multiple techniques to reduce the resources required to identify similar data objects. These techniques are described in detail in reference to following figures.

FIG. 2 shows vectors representing data object, according to some example embodiments. As shown, each vector ($V_1$, $V_2, V_3, V_4 \ldots V_n$) includes multiple dimension values, each of which represents a feature of the data object represented by the vector. The dimension values are floating values. For example, vector $V_1$ includes the dimension values, 0.1, 1.2, 3.1, etc. As another example, the vector $V_2$ includes the dimension values 0.4, 1.6, 3.2, etc. The dimension values in the same sequential position within each vector correspond to the same feature of the data object represented by the vector. For example, the vector $V_1$ includes the value 0.1 for the first feature, whereas vector $V_2$ includes the value 0.4 for the same first feature. These differences in values indicate differences in the data objects represented by each vector.

The size of the vectors is relatively large because each dimension value is a floating value requiring 4 bytes of space. As an example, a large data set with 1 billion items, each with 1024 dimensions, would require approximately 4 terabytes of data. To reduce the amount of space, the data manager 114 converts the floating values to binary values. For example, the data manager 114 assigns each floating value below a threshold value as a 0 and each floating value that meets or exceeds the threshold value as a 1. As a result of converting the floating values to binary values, only 1 bit is required to store each dimension of the vector, which reduces the space needed considerably. For example, a large data set with 1 billion items, each with 1024 dimensions, would require approximately 128 gigabytes of data, compared to 4 terabytes needed prior to conversion.

FIG. 3 shows vectors representing data objects that have been converted to binary values, according to some example embodiments. As shown, each dimension value in the vectors is either a 0 or a 1. The data manager 114 assigns a binary value to each dimension based on a threshold number. For example, the data manager 114 compares the floating values assigned to each dimension of a vector to the threshold number and determines whether the floating value is below the threshold or meets/exceeds the threshold value. If the floating value is below the threshold, the data manager 114 assigns a binary value of 0 to the dimension in the vector. Alternatively, if the floating value meets or exceeds the threshold value, the data manager 114 assigns a binary value of 1 to the dimension in the vector.

The data manager 114 determines the threshold value using any known technique in the art. For example, the threshold value may a mean value, average value, etc., of the floating values assigned to the dimensions in the vector.

The converted vectors are representations of the original vectors, however they are not exact. Accordingly, the data manager 114 uses the converted vectors to identify a subset of the vectors as candidate vectors that are similar to a target vector. The data manager 114 then performs the full distance functions on the smaller subset of candidate vectors utilizing the original floating values assigned to the candidate vectors and the target vector. Performing the distance functions on a smaller subset of candidate vectors greatly reduces the resources required to identify nearby vectors as compared to performing the distance functions on all of the vectors.

To identify the candidate vectors, the data manager 114 determines a hamming distance between a converted target vector and the other converted vectors. The hamming distance indicates the number of positions that differ between two binary strings. For example, to determine the hamming distance between the vector $V_1$ and the vector $V_2$ shown in FIG. 3, the data manager 114 compares the binary values at each position to identify the number of positions in which the two binary values do not match. As show, only the first and third binary values of vector $V_1$ and vector $V_2$ do not match. Hence, the data manager 114 determines that the hamming distance between vector $V_1$ and vector $V_2$ is 2. As another example, the first, fifth and sixth values of vectors $V_1$ and $V_3$ do not match. Accordingly, the data manager 114 determines that the hamming distance between vector $V_1$ and vector $V_3$ is 3.

The data manager 114 uses a hamming distance threshold to identify the subset of vectors that are candidate vectors. The hamming distance threshold indicates a maximum hamming distance value for vectors to be included as candidates. For example, a hamming distance threshold of 2 would result in the data manager 114 identifying all vectors that have a hamming distance of 2 or less as being candidate vectors. Any vectors with a hamming distance value above 2 (i.e., 3 or more) would not be included as a candidate vector. As another example, a hamming distance threshold of 1 would result in the data manager 114 identifying all vectors that have a hamming distance of 1 or less as being candidate vectors. Any vectors with a hamming distance value above 1 (i.e., 2 or more) would not be included as a candidate vector.

To further reduce resource usage in determining the hamming distance, the data manager 114 generates a set of sequentially ordered vector blocks for each vector and then uses the sets of sequentially ordered vector blocks to generate a block index. Each vector block in a set of sequentially ordered vector blocks contains a set of two or more binary values that are ordered sequentially in the vector, as well a numerical vector identifier identifying the vector.

The block index includes a set of vector block arrays where each individual vector block array corresponding to one sequential position. Each of the vector block arrays includes one vector block from each set of sequentially ordered vector blocks that correspond to the same sequential position. As an example, the first vector block array includes vector blocks from the first sequential position (i.e., including the first and second sequentially ordered binary values in the vector). The second vector block array includes the vector blocks from the second sequential position (i.e., including the third and fourth sequentially ordered binary values in the vector) and so forth. The vector blocks in each vector block array are ordered sequentially based on their binary values, such as from lowest to highest or vice versa.

In addition to generating the vector blocks, the data manager 114 encodes the data included in the vector blocks to further reduce their size. The data manager uses the vector array to quickly identify vectors that have a hamming distance below a threshold distance. This is discussed in greater detail with respect to FIGS. 4A-4E.

Figure 4A:
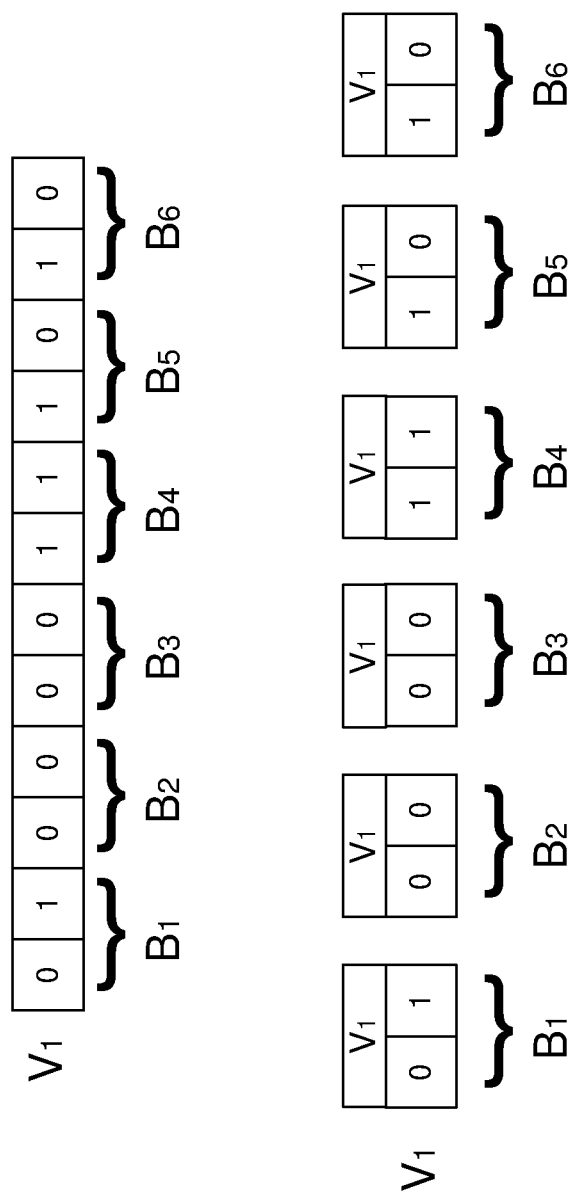

FIGS. 4A-4E show generating vector blocks and a block index, according to some example embodiments. FIG. 4A shows a set of vector blocks generated for a vector $V_1$. As shown, the vector $V_1$ is broken into a sequential set of vector blocks based in the sequential order of the binary values included in the vector $V_1$. Each vector block corresponds to a position of the vector $V_1$ and includes two sequentially ordered binary values from the position of the vector $V_1$, as well as a vector identifier that identifies vector $V_1$. For example, the vector block $B_1$ corresponds to the first position of the vector $V_1$ and includes the first two binary values of the vector $V_1$ (i.e., 0, 1). Similarly, the vector block $B_2$ corresponds to the second position of the vector $V_1$ and includes the third and fourth binary values of the vector $V_1$ (i.e., 0, 0). Each of the vector blocks include the vector identifier $V_1$ because each vector block corresponds to the vector $V_1$. Although the shown example includes two sequentially ordered binary values in each vector block, this is just one example, and is not meant to be limiting. The vector blocks cab be generated to include any number of two or more sequentially ordered binary values, such as 3, 4, 4, etc., although the number of sequentially ordered binary values in each vector block should be the same.

The data manager 114 generates a set of sequential vector blocks for each of the vectors. The data manager 114 then uses the vector blocks to generate a block index. The block index includes a set of block arrays. Each block array in the block index corresponds to one position in the vectors and includes a vector block from each vector that corresponds to the position. Further, the vector blocks in each block array are ordered sequentially based on the binary values included in the respective vector blocks. For example, the vector blocks are ordered from lower to highest, or vice versa.

Figure 4B:
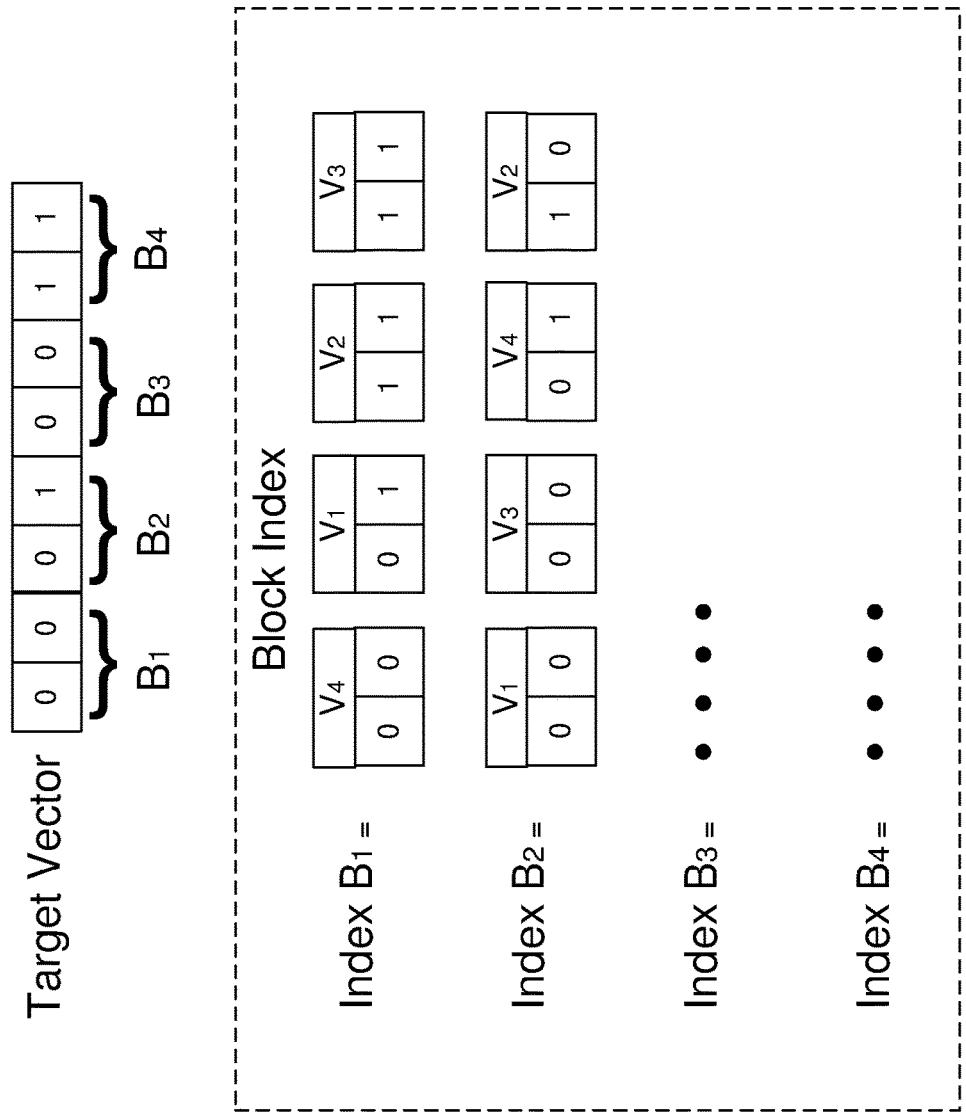

FIG. 4B shows a block index. As show, the block index includes four block arrays, each corresponding to a different position in the vectors. For example, the first block array corresponds to the first position in the vectors (i.e., $B_1$) and includes a vector block from each vector corresponding to position $B_1$. The second block array corresponds to the second position in the vectors (i.e., $B_2$) and includes a vector block from each vector corresponding to position $B_2$. The third block array corresponds to the third position in the vectors (i.e., $B_3$) and includes a vector block from each vector corresponding to position $B_3$. Finally, the fourth block array corresponds to the fourth position in the vectors (i.e., $B_4$) and includes a vector block from each vector corresponding to position $B_4$.

As shown, the vector blocks in each block array are ordered sequentially based on the binary values included in the vector blocks. For example, the first block array starts with the vector block from the vector $V_4$ that includes the binary value 0, 0, then moves to the vector block from the vector $V_1$ that includes the binary value 0, 1, and finally includes the vector blocks from the vectors $V_2$ and $V_3$ that both include the binary value 1, 1. Block arrays that include the same binary values are ordered sequentially according to the vector identifier from lowest to highest.

To determine the hamming distance between a target vector and the vectors included in the block index, the data manager 114 performs a binary search of each block array based on the corresponding binary values of the target vector. For example, given the shown target vector of 0, 0, 0, 1, 0, 0, 1, 1, the data manager 114 would perform a binary search of each block array based on the binary values of the target vector that are in the corresponding positions. For example, the data manager 114 performs a binary search of the first block index that corresponds to position $B_1$ based on the binary values in the target vector that are in position $B_1$ (i.e., 0, 0). Likewise, the data manager 114 performs a binary search of the second block index that corresponds to position $B_2$ based on the binary values in the target vector that are in position $B_2$ (i.e., 0, 1).

The data manager 114 performs the binary search to identify matching vector blocks and adds the matching vector blocks to the candidate list. For example, a binary search of the first block array would result in a match of the vector $V_4$ that includes binary values 0, 0. The data manager 114 then adds the vector $V_4$ to the candidate list. Likewise, a binary search of the second array would also result in the match of the vector $V_4$ that includes the binary values 0, 1. The data manager 114 repeats this process for each block array and adds and removes vectors from the candidate list according to desired implementations. For example, the vectors are added based on the desired threshold hamming distance. Once the data manager 114 has identified the set of candidate vectors, the data manager then performs a full distance search of the candidate vectors to identify the vectors that are nearest to the target vector. Performing the full distance on the smaller set of candidate vectors rather than the full set of vectors greatly reduces resource usage and latency in identifying the nearest vectors.

The data manager 114 further reduces resource usage by reducing the size of the block index. For example, the data manager 114 consolidates vector blocks that include the same binary value and encodes the binary values and vector identifiers.

As shown in FIG. 4C, the first block array includes two vector blocks that include the binary values 1, 1. Further, the second block array includes two vector blocks that include the binary values 0, 0. To reduce the amount of space used, the data manager can combine these vector blocks into a single vector block. The combined vector block includes the binary values as well as the vector identifiers for each of the combined vector blocks.

FIG. 4D shows combined vector blocks. As shown, the two vector blocks in the first block array have been combined into a single vector block. The single vector block includes one set of the binary values 1, 1, as well as the vector identifiers for the combined vector block (i.e., $V_2$, $V_3$). Likewise, the two vector blocks in the second block array have been combined into a single vector block. The single vector block includes one set of the binary values 0, 0, as well as the vector identifiers for the combined vector block (i.e., $V_1$, $V_3$). Combining vector blocks with the same binary values reduces the overall space utilized for the vector blocks. This reduction in size amounts to considerable resource savings when dealing with large data sets.

To further reduce the size of the combined vector blocks, the data manager 114 encodes the vector identifiers. Encoding the vector identifiers represents the vector identifiers based on the change from the previous vector identifier. For example, to encode the sequence 2, 7, 10, the data manager represents the first number as its original value (i.e., 2) and then represents the other two numbers based on the change in value from the previous number. For example, the second number 7 is 5 greater than the previous number 2 and the third number 10 is 3 greater than the previous number 7. Hence, the encoded sequence to represent 2, 7, 10 would be 2, 5, 3. Encoding the numerical values in this manner reduces the overall size needed to store these values, thereby reducing the overall size of the vector blocks.

FIG. 4E shows the block index with encoded vector identifiers. As shown, the vector identifiers for the combined vector blocks in the first vector array have been encoded to the values 2, 1. This represents that the first vector identifier is for the vector $V_2$ and the second vector identifier is one more than the previous value (i.e., the vector V3). Likewise, the vector identifiers for the combined vector blocks in the second vector array have been encoded to the values 1, 2. This represents that the first vector identifier is for the vector $V_1$ and the second vector identifier is two more than the previous value (i.e., the vector $V_3$). Encoding the vector identifiers in the combined vector blocks reduces the space required to store each vector identifier, which represents a substantial reduction in data in large data sets.

To further reduce the size of the block index, the data manager encodes the binary values of the vector blocks in each block array. The vector blocks in each vector array are ordered sequentially based on the binary values included in the vector blocks from lowest to highest. Rather than represent each set of binary values individually, the data manager represents the binary values based on the difference between the binary value and the previous binary value. For example, given the sequence 00, 00, 01, 10 and 11, the data manager 114 encodes the values based on the difference between the values and the previous value. The first value remains as 00, the second value is assigned 0 because there is no change from the previous value, the third value is assigned as 1 because it represents an increase of 1 from the previous value, the fourth values is assigned as 1 because it represents an increase of 1 from the previous value, and the fifth value is assigned as 1 because it represents an increase of 1 from the previous value. As a result, the binary sequence 00, 00, 01, 10, 11 is encoded as 00, 0, 1, 1, 1. Encoding the binary values further reduces the size of the individual vector blocks, which represents a substantial reduction in size in large data sets.

FIG. 4F shows the block index with encoded binary values. As shown, the first block array that previously had a sequence of 00, 01, 11 has been encoded to 00, 1, 2. The encoded values are based on the difference between the value and the previous value. For example, the difference between 00 and 01 is 1, so the value is encoded as 1 to represent the difference. Similarly, the difference between 01 and 11 is 2, so the value is encoded as 2 to represent the difference.

The second block array has also been encode. The second block array previously had a value of 00, 01, 10 and has been encoded as 00, 1, 1. The encoded values are based on the difference between the value and the previous value. For example, the difference between 00 and 01 is 1, so the value is encoded as 1 to represent the difference. Similarly, the difference between 01 and 10 is 1, so the value is encoded as 1 to represent the difference.

Figure 5:
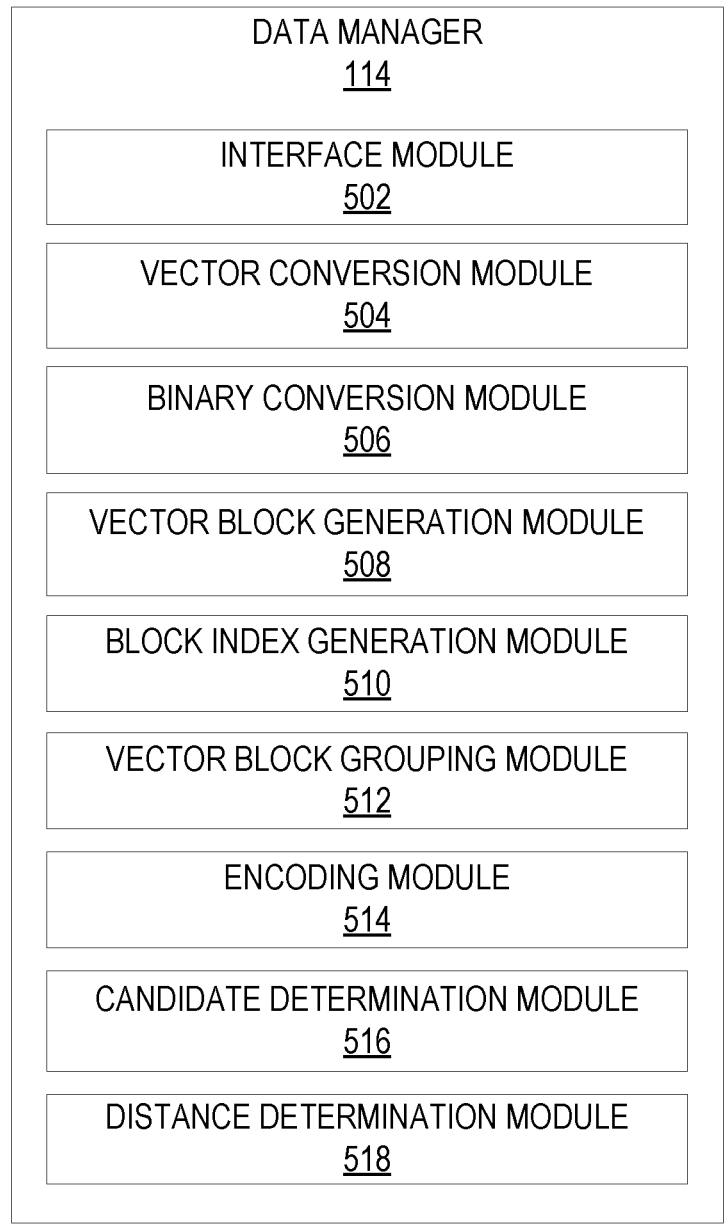
FIG. 5 shows an example block diagram of the data manager, according to some example embodiments.

FIG. 5 shows an example block diagram of the data manager 114, according to some example embodiments. To avoid obscuring the inventive subject matter with unnecessary detail, various functional components (e.g., modules) that are not germane to conveying an understanding of the inventive subject matter have been omitted from FIG. 5. However, a skilled artisan will readily recognize that various additional functional components may be supported by data manager 114 to facilitate additional functionality that is not specifically described herein. Furthermore, the various functional modules depicted in FIG. 5 may reside on a single computing device or may be distributed across several computing devices in various arrangements such as those used in cloud-based architectures.

As shown, data manager 114 includes an interface module 502, a vector conversion module 504, a binary conversion module 506, a vector block generation module 508, a block index generation module 510, a vector block grouping module 512, an encoding module 514, a candidate determination module 516, and a distance determination module 518.

The interface module 502 provides a user with a data management interface that enables the user to submit a search query based on a data object. The data management interface provides the user with user interface elements, such as a text boxes, buttons, check boxes, etc., that allow a user to submit a data object such as an image, file, audio file, etc. The submitted data object is a target data that the data manager 114 uses as a basis to search for other similar data objects. The data management interface presents the user with a listing of data objects returned in response to the user's search query.

The vector conversion module 504 generates a vector that represents a data object. The resulting vectors include multiple dimensions that each represent a feature of the data object. Each dimension includes a floating value that represents the corresponding feature.

The binary conversion module 506 converts the floating values included in a vector to binary values. The binary conversion module 506 utilizes a threshold value to convert the floating values to either a 1 or a 0. For example, the binary conversion module 506 converts the floating values that are below the threshold value to 0 and converts the floating values that meet or exceed the threshold value to 1.

The vector block generation module 508 generates a set sequentially ordered vector blocks for a vector. Each vector block in a set of sequentially ordered vector blocks contains a set of two or more binary values that are ordered sequentially in the vector, as well a numerical vector identifier identifying the vector.

The block index generation module 510 generates a block index based on the sets of sequentially ordered vector blocks. The block index includes a set of vector block arrays where each individual vector block array corresponds to one sequential position in the vector. Each of the vector block arrays includes one vector block from each set of sequentially ordered vector blocks that correspond to the same sequential position. As an example, the first vector block array includes vector blocks from the first sequential position (i.e., including the first and second sequentially ordered binary values in the vector). The second vector block array includes the vector blocks from the second sequential position (i.e., including the third and fourth sequentially ordered binary values in the vector) and so forth. The vector blocks in each vector block array are ordered sequentially based on their binary values, such as from lowest to highest or vice versa. Vector blocks with the same binary values are ordered sequentially based on the vector identifier values.

The vector block grouping module 512 groups vector blocks in each vector array that include the same binary values. The combined vector block includes a single set of the binary values as well as vector identifiers for each of the combined vector blocks. The vector identifiers are ordered sequentially from lowest to highest.

The encoding module 514 encodes the vector identifiers in the combined vector blocks as well as the binary values in each vector block. The encoding module 514 utilized differential encoding in which a value is encoded a value based on the difference between the value and the previous sequentially ordered value. For example, vector identifiers for a vector $V_5$ and $V_9$ would be encoded as 5, 5. The first value of 5 to represents the value of the first vector identifier (i.e., $V_5$) and the second value of 4 represents the difference between the second vector identifier (i.e., $V_9$) and the first vector identifier (i.e., $V_5$). The encoding module 514 similarly encodes the binary values included in each vector block. For example, the sequence 00, 01, 01, 11 is encoded as 00, 1, 0, 2. The initial 00 represents the first value, the second value of 1 represents the difference between 01 and 00, the third value of 0 represents that there is no change between the third and fourth values, and the fourth value of 2 represents that the difference between 11 and 01.

The candidate determination module 516 uses the block index to determine a set of candidate vectors that may be similar to a target vector. The candidate determination module 516 identifies the set of candidate vectors by determining a set of vectors that have a hamming distance below a threshold hamming distance. The hamming distance indicates the number of positions that differ between two binary strings.

To increase efficiency in identifying the vectors with a hamming distance below the threshold distance, the candidate determination module 516 performs a binary search of each block array based on the corresponding binary values of the target vector. For example, given a target vector of 0, 0, 0, 1, 0, 0, 1, 1, the candidate determination module 516 would perform a binary search of each block array based on the binary values of the target vector that are in the corresponding positions. For example, the candidate determination module 516 performs a binary search of the first block index that corresponds to position $B_1$ based on the binary values in the target vector that are in position $B_1$ (i.e., 0, 0). Likewise, the candidate determination module 516 performs a binary search of the second block index that corresponds to position $B_2$ based on the binary values in the target vector that are in position $B_2$ (i.e., 0, 1).

The candidate determination module 516 performs the binary search to identify matching vector blocks and adds the matching vector blocks to the candidate list. For example, if a binary search of the first block array results in a match of a vector $V_4$ that includes binary values 0, 0. The candidate determination module 516 then adds the vector $V_4$ to the candidate list. The candidate determination module 516 repeats this process for each block array and adds and removes vectors from the candidate list according to desired implementations. For example, the vectors are added or removed based on the desired threshold hamming distance.

The distance determination module 518 determines the distance between a target vector and the set of candidate vectors. The distance determination module 518 uses distance functions to identify vectors representing data objects that are close to the target vector representing a target data object. Nearby vectors indicate that the corresponding data objects match or are similar to the target data object. The distance determination module 518 uses the original version of the candidate vectors and the target vector that include floating values to determine the nearest vectors. The vectors identified as being nearest to the target vector are presented to the user as search results.

Figure 6:
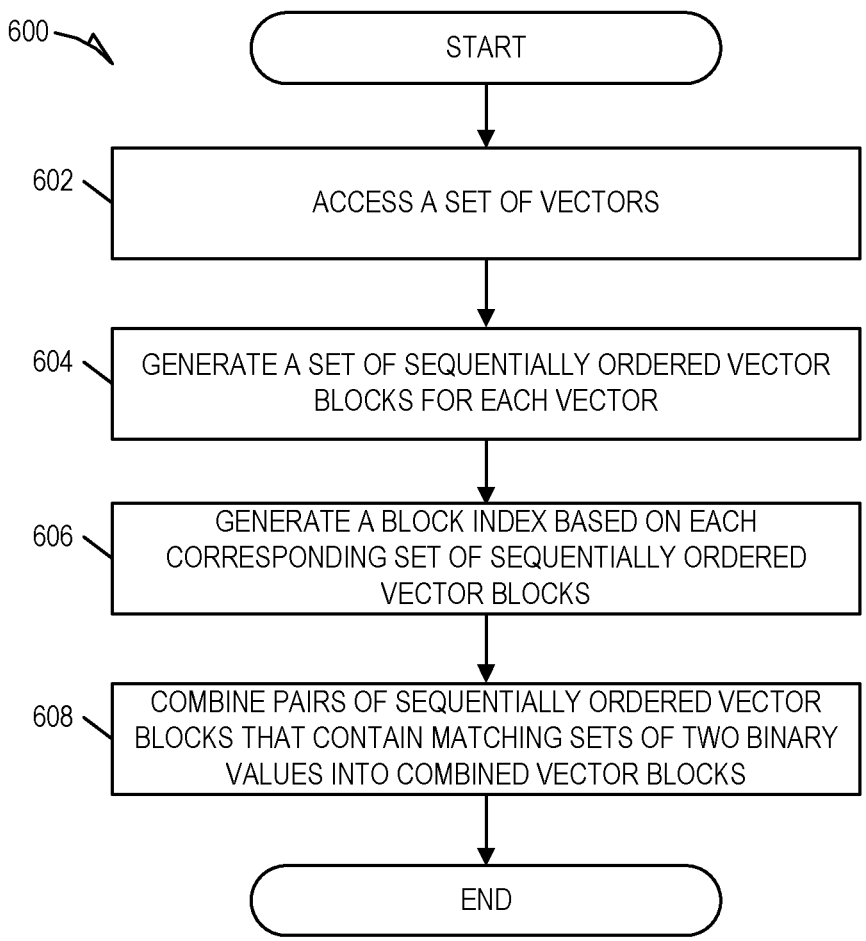
FIG. 6 shows an example method for smaller proximate search, according to some example embodiments.

FIG. 6 shows an example method for smaller proximate search, according to some example embodiments. The method 600 may be embodied in computer readable instructions for execution by one or more processors such that the operations of the method 600 may be performed in part or in whole by data manager 114; accordingly, the method 600 is described below by way of example with reference thereto. However, it shall be appreciated that at least some of the operations of the method 600 may be deployed on various other hardware configurations and the method 600 is not intended to be limited to data manager 114.

At operation 602, the data manager 114 accesses a set of vectors. Each vector contains binary values and is assigned a numerical vector identifier. Each vector represents a data object. For example, the vector conversion module 504 generates the set of vectors to represent a set of data objects. Each resulting vector includes floating values representing features of the corresponding data object. The binary conversion module 506 converts the floating values to binary values, resulting in the set of vectors.

At operation 604, the vector block generation module 508 generates a set of sequentially ordered vector blocks for each vector. Each vector block in a set of sequentially ordered vector blocks contains a set of two or more binary values ordered sequentially in the corresponding vector and the numerical vector identifier for the vector.

At operation 606, the block index generation module 510 generates a block index based on each corresponding set of sequentially ordered vector blocks. The block index includes a set of vector block arrays. Each vector block array corresponds to a respective sequential position and includes one vector block from each of the corresponding sets of sequentially ordered vector blocks that are in the respective sequential position. The vector blocks in each vector block array are ordered sequentially based on the two or more sequential binary values in each respective vector block.

At operation 608, the vector block grouping module 512 combines pairs of sequentially ordered vector blocks that contain matching sets of two binary values into combined vector blocks. Each combined vector block contains the respective matching set of two or more binary values and the numerical vector identifiers assigned to the respective pair of sequentially ordered vector blocks that were combined to form the combined vector block. The numerical vector identifiers included in each combined vector block are ordered sequentially from lowest to highest.

To further reduce the size of the block index, the encoding module 514 applies differential encoding to the numerical vector identifiers assigned to each pair of sequentially ordered vector blocks that were combined to form the combined vector. Further the encoding module 514 applies differential encoding based on the respective sets of two or more sequential binary values included in each vector block in the vector block array.

Figure 7:
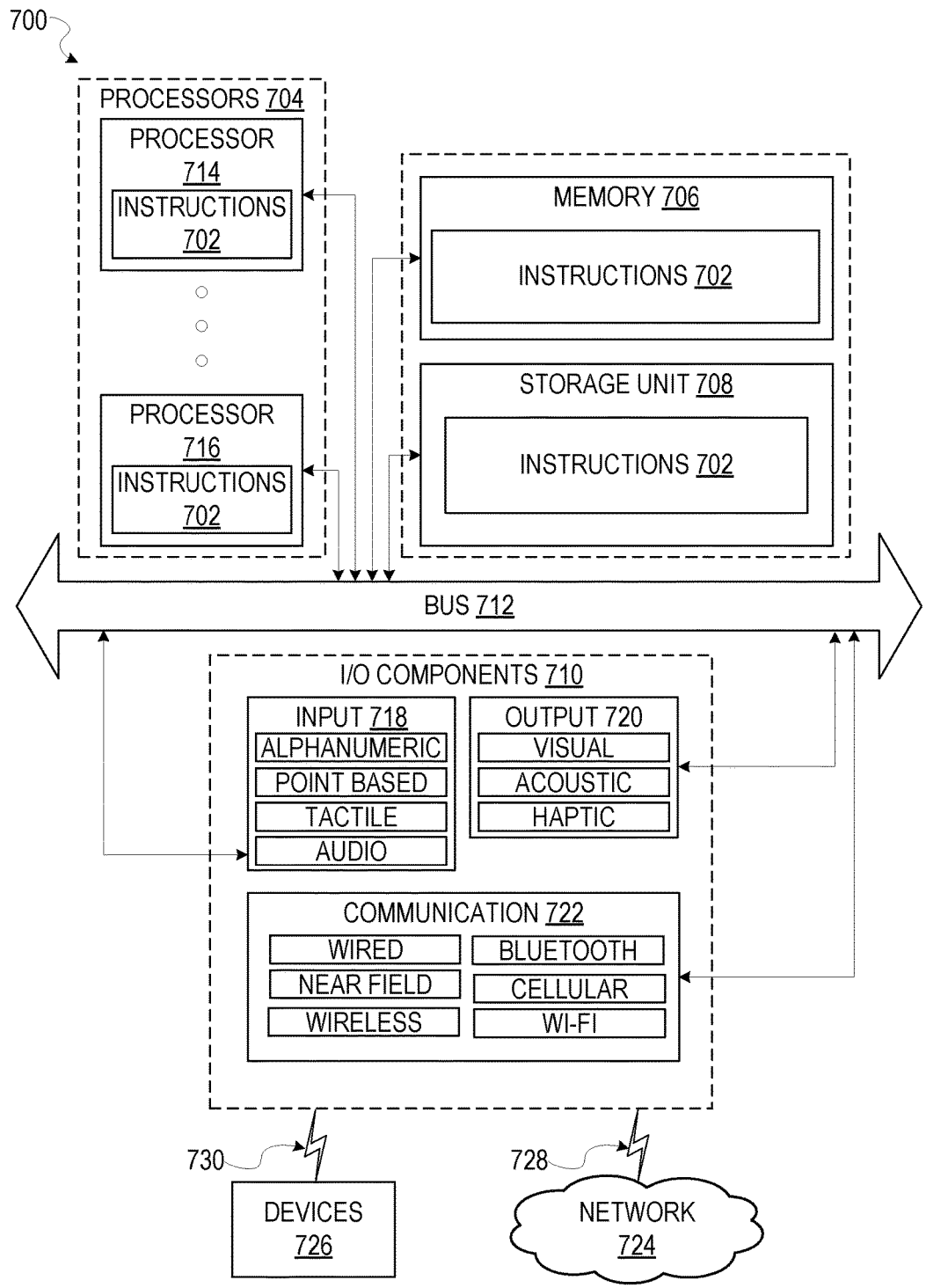
FIG. 7 shows a block diagram illustrating components of a computing device, according to some example embodiments, able to read instructions from a machine-readable medium (e.g., a machine-readable storage medium) and perform any one or more of the methodologies discussed herein

FIG. 7 shows a block diagram illustrating components of a computing device 700, according to some example embodiments, able to read instructions from a machine-readable medium (e.g., a machine-readable storage medium) and perform any one or more of the methodologies discussed herein. Specifically, FIG. 7 shows a diagrammatic representation of a computing device 700 in the example form of a system, within which instructions 702 (e.g., software, a program, an application, an applet, an app, a driver, or other executable code) for causing a computing device 700 to perform any one or more of the methodologies discussed herein may be executed. For example, the instructions 702 include executable code that causes the computing device 700 to execute a method 600. In this way, these instructions transform the general, non-programmed machine into a particular machine programmed to carry out the described and illustrated functions in the manner described herein. The computing device 700 may operate as a standalone device or may be coupled (e.g., networked) to other machines.

By way of non-limiting example, the computing device 700 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 702, sequentially or otherwise, that specify actions to be taken by the computing device 700. Further, while only a single computing device 700 is illustrated, the term "machine" shall also be taken to include a collection of computing devices 700 that individually or jointly execute the instructions 702 to perform any one or more of the methodologies discussed herein.

The computing device 700 may include processors 704, a memory 706, a storage unit 708 and I/O components 710, which may be configured to communicate with each other such as via a bus 712. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, both processors 714 and 716 that may execute the instructions 702. The term "processor" is intended to include multi-core processors that may comprise two or more independent processors (sometimes referred to as "cores") that may execute instructions contemporaneously. Although FIG. 7 shows multiple processors, the computing device 700 may include a single processor with a single core, a single processor with multiple cores (e.g., a multi-core process), multiple processors with a single core, multiple processors with multiples cores, or any combination thereof.

The memory 706 (e.g., a main memory or other memory storage) and the storage unit 708 are both accessible to the processors 704 such as via the bus 712. The memory 706 and the storage unit 708 store instructions 702 embodying any one or more of the methodologies or functions described herein. In some embodiments, a database 716 resides on the storage unit 708. The instructions 702 may also reside, completely or partially, within the memory 706, within the storage unit 708, within at least one of the processors 704 (e.g., within the processor's cache memory), or any suitable combination thereof, during execution thereof by the computing device 700. Accordingly, the memory 706, the storage unit 708, and the memory of the processors 704 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store the instructions 702. The term "machine-readable medium" shall also be taken to include any medium, or combination of multiple media, that is capable of storing instructions (e.g., the instructions 702) for execution by a machine (e.g., the computing device 700), such that the instructions, when executed by one or more processors of the computing device 700 (e.g., processors 704), cause the computing device 700 to perform any one or more of the methodologies described herein (e.g., method 600). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 710 may include a wide variety of components to receive input, provide output, produce output, transmit information, exchange information, capture measurements, and so on. The specific I/O components 710 that are included in a particular machine will depend on the type of machine. For example, portable machines such as mobile phones will likely include a touch input device or other such input mechanisms, while a headless server machine will likely not include such a touch input device. It will be appreciated that the I/O components 710 may include many other components that are not specifically shown in FIG. 7. The I/O components 710 are grouped according to functionality merely for simplifying the following discussion and the grouping is in no way limiting. In various example embodiments, the I/O components 710 may include input components 718 and output components 720. Input components 718 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. Output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. I/O components 710 may include communication components 722 operable to couple the computing device 700 to the network 724 or the devices 726 via a coupling 728 and a coupling 730, respectively. For example, the communication components 722 may include a network interface component or other suitable device to interface with the network 724. In further examples, the communication components 722 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 726 may be another machine or any of a wide variety of peripheral devices (e.g., a peripheral device coupled via a Universal Serial Bus (USB)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A computer-implemented method comprising:
   accessing a set of vectors, each vector containing binary values and being assigned a numerical vector identifier;
   for each vector from the set of vectors, generating a corresponding set of sequentially ordered vector blocks, each vector block from the corresponding set of sequentially ordered vector blocks containing a set of two or more binary values ordered sequentially in the vector and the numerical vector identifier for the vector;
   generating, using one or more processors, a block index based on each corresponding set of sequentially ordered vector blocks, the block index including a set of vector block arrays, each vector block array corresponding to a respective sequential position and including one vector block from each of the corresponding sets of sequentially ordered vector blocks that are in the respective sequential position, the vector blocks in each vector block array being ordered sequentially based on the two or more sequential binary values in each respective vector block; and
   for each vector block array, combining pairs of sequentially ordered vector blocks containing matching sets of two or more binary values into combined vector blocks, each combined vector block containing the respective matching set of two or more binary values and numerical vector identifiers assigned to the respective pair of sequentially ordered vector blocks that were combined to form the combined vector block.

2. The computer-implemented method of claim 1, further comprising:
   for each vector from the set of vectors, converting floating values in to the binary values based on a threshold value.

3. The computer-implemented method of claim 1, wherein the numerical vector identifiers included in each combined vector block are ordered sequentially from lowest to highest.

4. The computer-implemented method of claim 3, further comprising:
   for each combined vector block, applying differential encoding to the numerical vector identifiers assigned to the respective pair of sequentially ordered vector blocks that were combined to form the combined vector.

5. The computer-implemented method of claim 4, further comprising:
   for each vector block array, applying differential encoding based on the respective sets of two or more sequential binary values included in each vector block in the vector block array.

6. The computer-implemented method of claim 1, wherein each vector corresponds a data object represented by the respective vector.

7. The computer-implemented method of claim 1, further comprising:
   receiving a target data object;
   converting the target data object to a target vector of floating values;
   converting the floating values in the target vector to binary values;
   identifying, based on the block index, a candidate set of vectors that have a hamming distance from the target vector that is below a threshold hamming distance;
   determining, from the set of candidate set of vectors, a subset of vectors that are nearest to the target vector.

8. A data management system comprising:
   one or more computer processors; and
   one or more computer-readable mediums storing instructions that, when executed by the one or more computer processors, cause the data management system to perform operations comprising:
      accessing a set of vectors, each vector containing binary values and being assigned a numerical vector identifier;
      for each vector from the set of vectors, generating a corresponding set of sequentially ordered vector blocks, each vector block from the corresponding set of sequentially ordered vector blocks containing a set of two or more binary values ordered sequentially in the vector and the numerical vector identifier for the vector;
      generating a block index based on each corresponding set of sequentially ordered vector blocks, the block index including a set of vector block arrays, each vector block array corresponding to a respective sequential position and including one vector block from each of the corresponding sets of sequentially ordered vector blocks that are in the respective sequential position, the vector blocks in each vector block array being are ordered sequentially based on the two or more sequential binary values in each respective vector block; and for each vector block array, combining pairs of sequentially ordered vector blocks containing matching sets of two or more binary values into combined vector blocks, each combined vector block containing the respective matching set of two or more binary values and numerical vector identifiers assigned to the respective pair of sequentially ordered vector blocks that were combined to form the combined vector block.

9. The data management system of claim 8, the operations further comprising:

for each vector from the set of vectors, converting floating values in to the binary values based on a threshold value.

10. The data management system of claim 8, wherein the numerical vector identifiers included in each combined vector block are ordered sequentially from lowest to highest.

11. The data management system of claim 10, the operations further comprising:

for each combined vector block, applying differential encoding to the numerical vector identifiers assigned to the respective pair of sequentially ordered vector blocks that were combined to form the combined vector.

12. The data management system of claim 11, the operations further comprising:

for each vector block array, applying differential encoding based on the respective sets of two or more sequential binary values included in each vector block in the vector block array.

13. The data management system of claim 8, wherein each vector corresponds a data object represented by the respective vector.

14. The data management system of claim 8, the operations further comprising:

receiving a target data object;

converting the target data object to a target vector of floating values;

converting the floating values in the target vector to binary values;

identifying, based on the block index, a candidate set of vectors that have a hamming distance from the target vector that is below a threshold hamming distance;

determining, from the set of candidate set of vectors, a subset of vectors that are nearest to the target vector.

15. A non-transitory computer-readable medium storing instructions that, when executed by one or more computer processors of a computing system, cause the computing system to perform operations comprising:

accessing a set of vectors, each vector containing binary values and being assigned a numerical vector identifier;

for each vector from the set of vectors, generating a corresponding set of sequentially ordered vector blocks, each vector block from the corresponding set of sequentially ordered vector blocks containing a set of two or more binary values ordered sequentially in the vector and the numerical vector identifier for the vector;

generating a block index based on each corresponding set of sequentially ordered vector blocks, the block index including a set of vector block arrays, each vector block array corresponding to a respective sequential position and including one vector block from each of the corresponding sets of sequentially ordered vector blocks that are in the respective sequential position, the vector blocks in each vector block array being are ordered sequentially based on the two or more sequential binary values in each respective vector block; and for each vector block array, combining pairs of sequentially ordered vector blocks containing matching sets of two or more binary values into combined vector blocks, each combined vector block containing the respective matching set of two or more binary values and numerical vector identifiers assigned to the respective pair of sequentially ordered vector blocks that were combined to form the combined vector block.

16. The non-transitory computer-readable medium of claim 15, the operations further comprising:

for each vector from the set of vectors, converting floating values in to the binary values based on a threshold value.

17. The non-transitory computer-readable medium of claim 15, wherein the numerical vector identifiers included in each combined vector block are ordered sequentially from lowest to highest.

18. The non-transitory computer-readable medium of claim 17, the operations further comprising:

for each combined vector block, applying differential encoding to the numerical vector identifiers assigned to the respective pair of sequentially ordered vector blocks that were combined to form the combined vector.

19. The non-transitory computer-readable medium of claim 18, the operations further comprising:

for each vector block array, applying differential encoding based on the respective sets of two or more sequential binary values included in each vector block in the vector block array.

20. The non-transitory computer-readable medium of claim 15, wherein each vector corresponds a data object represented by the respective vector.

* * * * *